United States Patent Office 3,423,242
Patented Jan. 21, 1969

3,423,242
ELECTRIC CURRENT-PRODUCING CELL WITH ANHYDROUS ORGANIC LIQUID ELECTROLYTE
William F. Meyers, Blue Bell, and John W. Simmons, Philadelphia, Pa., assignors to Livingston Electronic Corporation, Montgomeryville, Pa., a corporation of New Jersey
No Drawing. Filed Oct. 28, 1964, Ser. No. 407,228
U.S. Cl. 136—6                                   18 Claims
Int. Cl. H01m 17/00

ABSTRACT OF THE DISCLOSURE

In an electric current producing cell utilizing an anhydrous organic liquid as electrolyte solvent there is provided, in contact with the solvent, an atmosphere of a gaseous ligand compound which forms, with the solute of the electrolyte, a coordination complex coupling the solute and the solvent resulting in improved energy output.

---

The present invention relates to improvements in electric current-producing cells; and, more particularly, the present invention relates to improvements in cells utilizing non-aqueous electrolytes and electrolyte solvents whereby the output of such cells is increased and other valuable improvements are realized. The invention described herein was made in the performance of work under a NASA contract and is subject to the provisions of the National Aeronautics and Space Act of 1958, Public Law 85–568 (72 Stat. 426; 42 U.S.C. 2451), as amended.

For years the art of battery construction and development has been performed utilizing aqueous electrolyte systems; that is, electrolytes in which the electrolyte solvent is water. Aqueous cell system possess many well known limitations. The most important disadvantage of cells and batteries utilizing an aqueous electrolyte is the decomposition potential of breakdown voltage of aqueous solutions of acids and bases (around 1.7 volts) and of aqueous solutions of alkali metal and alkaline earth metal salts of strong acids (around 2.2 volts). The second major disadvantage of cells and batteries containing an aqueous electrolyte system is the narrow temperature range at which they can operate effectively. At low temperatures, a battery containing an aqueous electrolyte gives poor performance. Other disadvantages of batteries containing aqueous electrolyte systems are drifts and hysteresis which occur with saturated as well as unsaturated cells. Drift is the progressive change in e.m.f. that occurs while a cell is kept at a constant temperature. Hysteresis is a temporary deviation from the correct voltage which follows an abupt change in temperature. Other major areas of disadvantages of aqueous cell systems are high corrosion rate of electrode materials, short shelf life and space orientation problems.

The limitations of aqueous electrolytes under low temperature operation have led to investigations of non-aqueous systems wherein the electrolyte solvent is a liquid other than water. "New Cathode-Anode Couples Using Nonaqueous Electrolytes," Technical Documentary Report No. ASD-TDR-62-1 for April 1962 (Flight Accessories Laboratory, Aeronautical Systems Division, Air Force Systems Command, Wright-Patterson Air Force Base) discloses such widely differing organic liquids as acetonitrile, butyrolactone, N,N' - dimethylformamide, ethylenediamine, pyridine and propylene carbonate as solvents for current-producing cells. Cells embodying the use of organic solvents are also disclosed in the patent literature; for example, U.S. Patents 2,597,451, 2,597,- 452, 2,597,453, 2,597,454, 2,597,455 and 2,597,456. Since such liquids as such are non-conductive (as is water itself) an ionizable material must be dissolved and ionized therein to provide a conductive solution. Such materials are salts especially those in which the cation is ammonium (including substituted ammonium) or a metal above zinc in the electrochemical series, such as the alkali metals, the alkaline earth metals, aluminum, zinc, beryllium and boron.

Non-aqueous solvents have their own peculiar limitations. One of these is poor solubility of the solute salt therein (resulting in a poorly conducting solution) in many instances. Organic liquids are normally poor solvents for salts, and solubility of a given salt in the solvent is necessary to provide the conductivity necessary to generate current electrochemically. Another of these limitations is low decomposition potential. While a particular organic solvent may dissolve the desired electrolyte solute salt sufficiently, it may decompose easily under the electric stress of active electrode materials, that is electrode couples that exceed one volt. Either or both of these limitations, as well as other factors, results in poor energy output, or at least in an energy output that could stand improving.

It is the principal object of the present invention to provide an improved electric current producing cell of the non-aqueous type.

It is another object of the present invention to improve the energy output of non-aqueous electric current-producing cell systems.

It is a further object of the present invention to enhance either one or both of the electrical conductivity and decomposition potential of non-aqueous electrolytes of non-aqueous current-producing cell systems.

Other objects will become apparent from a consideration of the following specification and claims.

The present improvement comprises, in a non-aqueous electrochemical electric current-producing cell involving an anode and a cathode and an electrolyte in contact with said anode and a depolarizing cathode in which the solvent is a non-aqueous organic liquid, an atmosphere of a gaseous compound, other than air and different from said electrolyte solvent, in contact with said solvent, said compound being soluble in said electrolyte solvent and forming with the electrolyte solute of said electrolyte a coordination complex coupling said solute and said solvent.

The cell of the present invention may be primary or secondary, and may or may not be of the deferred action type depending upon whether one of the elements is held out of contact with the others until activation.

The improvement of the present invention may be said to add, to the existing technology of non-aqueous current-producing cells, an atmosphere of a gas, in contact with the non-aqueous electrolyte, which acts as a ligand. The present invention is not concerned as such with the particular non-aqueous organic solvent selected. As pointed out above, a number of widely different organic liquids have already been investigated. And, as will be apparent to those skilled in this art, there are many other organic liquids which will also have utility. Data are set forth hereinafter on acetonitrile, butyrolactone, dimethyl sulfoxide, isopropylamine, N-methyl-2-pyrolidone, N,N-dimethylformamide, propylene carbonate, pyridine, and high molecular weight, water insoluble secondary amine halides. Such compounds cannot be grouped into any particular chemical class; however, those to which the present invention is particularly applicable are those having a low dielectric constant—generally less than 10. Water is to be avoided so that the solvent, and electrolyte prepared therefrom, will be substantially anhydrous.

Likewise, the present invention is not primarily concerned with the particular solute selected. Many salts have already been investigated by the prior art mentioned previously herein, and data are set forth hereinafter on widely differing salts. Fundamentally the solute salt should, at least upon complexing by the ligand gas in accordance with the present invention, dissolve and ionize in the solvent. It has been found that salts the cation of which is ammonium, including substituted ammonium, or a metal above zinc in the electrochemical series, are particularly satisfactory. Such metal cations include: the alkali metals, especially sodium, potassium and lithium; the alkaline earth metals, especially calcium and magnesium; aluminum; zinc; beryllium; boron, and the like. The anion of the salt may vary, and salts having such widely differing anions as the halogens-chlorine, bromine, fluorine and iodine; thiocyanate; perchlorate; fluoborate, and trichloroacetate have been investigated. Examples of typical solute salts are: lithium chloride, lithium fluoride, potassium bromide, potassium iodide, sodium iodide, sodium chloride, magnesium bromide, calcium chloride, aluminum chloride, aluminum fluoride, tetramethylammonium chloride, ethyl pyridinium bromide, potassium thiocyanate, lithium perchlorate, magnesium perchlorate, sodium trichloroacetate, potassium fluoborate and the like.

The cell will have an anode, and, in accordance with known practice, the anode will be of a metal above zinc in the electrochemical series. Such metals have been mentioned above in connection with metal cations of the solute salt. These metals are characterized by their low atomic weights and the ease with which they release electrons. Lithium is presently preferred. The stated anode metal may constitute substantially the entire anode structure or the anode metal may be mixed with a less active metal as in an alloy. An anecter, that is a relatively inctive but highly conductive metal like silver, nickel and iron, may be used in contact with the defined anode metal as a means of conducting current from the cell or to a lead wire.

Likewise, the cathode material (depolarizer) may be selected in accordance with considerations well known in this art. Cathode materials are characterized by the ease with which they accept electrons. Such materials include elements from groups V–A, VI–A and VII–A of series 1 and 2 of the Periodic Table, especially oxygen, sulfur, fluorine and chlorine, and compounds containing such elements, such as sulfates, especially those of the heavy metals, like mercurous sulfate, mercuric sulfate, lead sulfate, and the like; halides, like cupric chloride, cupric fluoride, nickelous fluoride, and the like; halogenated organic compounds, like sodium dichloroisocyanurate; sulfides, like cupric sulfide; and oxides, like manganese dioxide, nickel dioxide, lead dioxide, silver oxide, vanadium pentoxide, stannic oxide, and the like. Since the cathode material itself is normally non-conductive there may be associated therewith a cathecter, like carbon, silver, nickel or platinum, which is inert to the electrolyte and serves to conduct current to the cathode terminal. Finely-divided inert conductive material may also be intimately mixed with the cathode material.

Historically, the atmosphere in contact with the electrolyte in aqueous and organic solvent cells has been air. In liquid ammonia cells, where the solvent is liquid ammonia, any atmosphere is simply the gaseous ammonia in equilibrium with the body of liquid ammonia, or, in some cases, an inert atmosphere, like argon, has been used. In accordance with the present invention, however, there is provided, in contact with the organic liquid electrolyte, a ligand gas atmosphere. That is to say, the only atmosphere in contact with the electrolyte is a gaseous compound different from the solvent and soluble therein to form a coordination complex with the solute salt. Examples of suitable ligand gases are ammonia, carbon dioxide, sulfur dioxide, hydrogen sulfide, hydrogen fluoride and phosphene. Ammonia, carbon dioxide and sulfur dioxide are presently preferred.

Such compounds are characterized by a structure having available electrons to share, and, in complexing the solute, these electrons are shared with the solute. More specifically, these shared electrons satisfy the secondary or non-ionizable valency of the cation of the solute salt. As an illustration, using aluminum chloride as the solute and ammonia as the ligand gas atmosphere, the resulting system may be depicted as follows (aluminum having a coordinating number of 4):

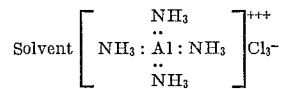

Thus, the electrolyte is, in a sense, a three-phase system consisting of the solvent, the solute and the ligand. The complex is much more soluble in the solvent than is the solute alone.

While not limiting relationships, it has been found that: ammonia serves as an especially good ligand with nitrogen-containing solvents like pyridine, N,N-dimethylformamide, isopropyl amine, acetonitrile and high molecular weight, water insoluble secondary amine halides; sulfur dioxide serves as an especially good ligand with sulfur-containing solvents, like dimethyl sulfoxide, and carbon dioxide serves as an especially good ligand with carbonyl compounds, like butyrolactone, N-methyl-2-pyrolidone and propylene carbonate. However, sulfur dioxide also performs especially well with propylene carbonate and isopropylamine.

The ligand gas atmosphere will be under a pressure less than the vapor pressure of the pure ligand under the temperature conditions of operation, that is, the ligand should not condense as such. The actual partial pressure of the ligand gas atmosphere may depend upon the stability of the complex formed. Highly unstable complexes would require high partial pressures (many atmospheres) to form and maintain the complex. Highly stable complexes, on the other hand, would occasion but very low partial pressures (well below atmospheric), although higher pressures could be used. Thus, the optimum pressure for the ligand gas atmosphere will depend upon the particular ligand, solute and solvent combined. In any event, the partial pressure of the ligand gas atmosphere should be sufficient to form and maintain the complex. This can readily be determined in any case by preparing the cell except for the ligand, then displacing the air, in contact with the electrolyte, with the ligand gas, and, while gradually adding ligand gas to the cell, measuring the in energy output, and other electrical characteristics, until a significant increase or optimum region is reached. The object is to form and maintain the complex, and there is no advantage (and there may well be disadvantage) in exceeding this to the point of dissolving excess ligand in the solvent or condensing ligand as such.

The present invention results in improved energy output. In addition, it reduces the internal resistance loss of the cell by increasing the conductivity of the electrolyte, or reduces the corrosion loss by increasing the decomposition potential of the solvent in the electrolyte system, or both. Increasing the conductivity of the electrolyte further provides higher drain rates and higher efficiencies. Increasing the decomposition potential provides improved shelf life and less gassing and permits the employment of more active anodes and/or cathodes.

To illustrate improvements realized in accordance with the present invention the following examples, including the data in the tables, are set forth, and the systems given are for the purpose of illustration only and are not intended to limit the scope of the invention in any way:

Example 1

Encased in a flat polyethylene bag is a lamina or "sandwich" structure (1.5" x 1.5") made up of the following layers in the order given: (1) anode—1 gram of lithium metal pressed into a fine nickel screen, the latter serving as anecter; (2) sheet of ordinary blotting paper to serve as separator; (3) cathode—2 grams of a 6:1:1 mixture of vanadium pentoxide, carbon and paper fibers blended and dry pressed into a sheet on a nickel screen, the latter serving as cathecter; (4) blotting paper as in 2 above; and (5) anode as in 1 above. Lead wires are connected to the anodes and cathode.

In the cell were placed 5 cc. of N,N-dimethylformamide containing, initially, excess undissolved lithium perchlorate, but into which ammonia gas had been bubbled until a strong ammonia odor was evident. The bag is then sealed, and the cell is connected in a circuit containing recording meters. Discharging at a constant current drain of 10 milliamperes, the initial closed circuit voltage was 1.5 volts, and the cell ran for 16 hours to a final cut-off voltage of 0, with an average voltage of 1 volt.

Another cell identical to that described above but into the electrolyte of which no ammonia had been passed, ran for only 3.8 hours under the same conditions (initial closed circuit voltage of 1.5 volts, constant current drain of 10 milliamperes and to cut-off voltage of 0) with an average voltage of 0.9 volt.

Example 2

A cell is prepared as in Example 1 (with ammonia as ligand) but in which stannic oxide is used in place of vanadium pentoxide in the cathode. Discharging at a constant current drain of 10 milliamperes, the cell had an initial closed circuit voltage of 1.5 volts, and ran for 14.6 hours to a final cut-off voltage of 0 volt with an average voltage of 0.7 volt.

Example 3

A cell is prepared as in Example 1 (with ammonia as ligand) but in which cupric oxide is used in place of vanadium pentoxide in the cathode. Discharging at a constant current drain of 10 milliamperes, the cell had an initial closed circuit voltage of 2.4 volts and ran for 19.4 hours to a cut-off voltage of 0.8 volt, with an average voltage of 1 volt.

Examples 4–32

For the sake of convenience, the following data, showing the utility of various ligands with various solvents and solutes, were obtained using a conventional glass conductivity cell. Smooth platinum electrodes were provided to enter the cell from the bottom so as to leave unobstruted the surface of the electrolyte in contact with the ligand atmosphere. The electrolytes were prepared by adding the designated salt to the designated solvent in an amount equivalent to 2 M concentration. Where the salt is not soluble initially, it is supported in the solvent on a fine platinum screen. The cell was then placed in a pressure vessel. After taking initial readings of specific resistance and decomposition potential, the air atmosphere was displaced with the designated ligand gas. The gas was solwly admitted over about 16 hours and during this time readings of specific resistance and decomposition potential were taken. The work was conducted at room temperature. From the measurements, the increase factor in theoretical energy density, in watt hours per pound of net electrode reactants, as between no ligand and peak performance with ligand, is calculated. In other words, where the increase factor is, for example, 2, this means that the calculated energy density with the designated ligand (at the stated pressure where given) is twice that when no ligand is used.

TABLE I

| Ex. | Solvent | Solute | Ligand | Pres. (atm.) | Factor of increase in energy density |
|---|---|---|---|---|---|
| 4 | Acetonitrile | LiCl | $NH_3$ | (¹) | 2 |
| 5 | do | TMAC ² | $NH_3$ | (¹) | 20 |
| 6 | do | KBr | $NH_3$ | 9.3 | 2 |
| 7 | Butyrolactone | $AlCl_3$ | $CO_2$ | 6.3 | 3.9 |
| 8 | do | LiCl | $CO_2$ | (¹) | 4.2 |
| 9 | do | KI | $CO_2$ | 6.3 | 27.3 |
| 10 | do | KSCN | $CO_2$ | 24.4 | 61 |
| 11 | do | NaI | $CO_2$ | 4.3 | 3.7 |
| 12 | do | TMAC ¹ | $CO_2$ | 11.2 | 6.1 |
| 13 | Dimethyl-sulfoxide | $AlCl_3$ | $SO_2$ | 3.8 | 3.5 |
| 14 | do | Sodium trichloro-acetate. | $SO_2$ | (¹) | 3.4 |
| 15 | Isopropylamine | $AlCl_3$ | $SO_2$ | 3.3 | 170 |
| 16 | do | LiCl | $SO_2$ | 3 | 50 |
| 17 | N-methyl-2-pyrolidone. | $AlCl_3$ | $CO_2$ | 1.5 | 21 |
| 18 | do | LiCl | $CO_2$ | 20 | 10 |
| 19 | do | KBr | $CO_2$ | 5.2 | 20 |
| 20 | do | KI | $CO_2$ | 5.8 | 27 |
| 21 | do | KSCN | $CO_2$ | 5.5 | 19 |
| 22 | do | TMAC ² | $CO_2$ | 24 | 33 |
| 23 | N,N-dimethyl formamide. | $AlCl_3$ | $NH_3$ | (¹) | 5 |
| 24 | do | KBr | $NH_3$ | (¹) | 11 |
| 25 | Propylene carbonate | $AlF_3$ | $CO_2$ | 21.6 | 1.2 |
| 26 | do | $AlCl_3$ | $CO_2$ | (¹) | 2.5 |
| 27 | do | LiF | $CO_2$ | (¹) | 1.05 |
| 28 | do | KSCN | $CO_2$ | 9.7 | 12.5 |
| 29 | do | NaCl | $CO_2$ | 10.4 | 5 |
| 30 | do | $MgBr_2$ | $CO_2$ | (¹) | 1.2 |
| 31 | Pyridine | LiCl | $NH_3$ | (¹) | 1.3 |

¹ Not recorded, but over 1 atmosphere.
² Tetramethyl ammonium chloride.

In the foregoing, in addition to the improved energy density there was also a marked reduction in internal resistance loss in Examples 1, 3, 23, 24 and 27; a marked reduction in corrosion loss in Examples 2, 4–8, 10–14, 16–18, 20, 21, 25, 26 and 28, and a marked reduction in both in Examples 9, 15, 19 and 22.

In the following systems the cells without the ligand gas atmosphere gave essentially no output so that the output with ligand is given as an estimated maximum practical output, in watt hours per pound, for the system based on the measurements and theoretical calculations:

Examples 32–38

TABLE II

| Ex. | Solvent | Solute | Ligand | Pres. (atm.) | Estimated output (wt./hrs./lb.) |
|---|---|---|---|---|---|
| 32 | Dimethylsulfoxide | NaI | $SO_2$ | 3.7 | 516 |
| 33 | Isopropylamine | LiF | $SO_2$ | 2.9 | 853 |
| 34 | N,N-dimethyl formamide. | TMAC [2] | $NH_3$ | [1] | 278 |
| 35 | Propylene carbonate | $AlCl_3$ | $SO_2$ | 1.4 | 795 |
| 36 | do | LiCl | $SO_2$ | 3.5 | 731 |
| 37 | do | NaI | $SO_2$ | 2.9 | 789 |
| 38 | Liquid secondary amine chloride. [3] | LiCl | $NH_3$ | [1] | 8.3 |

[1] Not recorded, but over 1 atmosphere.
[2] Tetramethyl ammonium chloride.
[3] Molecular weight 351–393; "Amberlite LA–1" of Rohm & Haas Company, in chloride form.

In Examples 32 and 34, in addition to improved energy output, there was marked reduction in corrosion loss, and in Examples 29–31 and 33, there was marked reduction in internal resistance and corrosion loss.

Modification is possible in selecting particular cell elements, including solvent, solute and ligand, without departing from the scope of the present invention.

What is claimed is:

1. In a non-aqueous electrochemical electric current-producing cell involving an anode and a cathode and an electrolyte in contact with said anode and cathode in which the solvent is an anhydrous organic liquid, the improvement which comprises an atmosphere of a gaseous ligand compound, different from said electrolyte solvent, in contact with said solvent, said ligand compound also being in said electrolyte as a coordination complex coupling the electrolyte solute of said electrolyte and said solvent.

2. The cell of claim 1 wherein said gaseous ligand compound is selected from the group consisting of ammonia, carbon dioxide, sufur dioxide, hydrogen sulfide, hydrogen fluoride and phosphene.

3. The cell of claim 1 wherein said gaseous ligand compound is ammonia.

4. The cell of claim 1 wherein said gaseous ligand compound is carbon dioxide.

5. The cell of claim 1 where in said gaseous ligand compound is sulfur dioxide.

6. The cell of claim 1 wherein said gaseous ligand compound is ammonia, and wherein said organic liquid solvent is a nitrogen-containing organic liquid.

7. The cell of claim 6 wherein said organic liquid solvent is pyridine.

8. The cell of claim 6 wherein said organic liquid solvent is N,N-dimethyl formamide.

9. The cell of claim 6 wherein said organic liquid solvent is isopropylamine.

10. The cell of claim 6 wherein said organic liquid solvent is acetonitrile.

11. The cell of claim 1 wherein said gaseous liquid compound is carbon dioxide, and wherein said organic liquid solvent is a carbonyl compound.

12. The cell of claim 11 wherein said organic liquid solvent is butyrolactone.

13. The cell of claim 11 wherein said organic liquid solvent is N-methyl-2-pyrolidone.

14. The cell of claim 11 wherein said organic liquid solvent is propylene carbonate.

15. The cell of claim 1 wherein said gaseous ligand compound is sulfur dioxide, and wherein said organic liquid solvent is a sulfur-containing compound.

16. The cell of claim 1 wherein said organic liquid solvent is dimethyl sulfoxide.

17. The cell of claim 1 wherein said gaseous ligand compound is sulfur dioxide, and wherein said organic liquid solvent is propylene carbonate.

18. The cell of claim 1 wherein said gaseous ligand compound is sulfur dioxide, and wherein said organic liquid solvent is isoproplyamine.

References Cited

UNITED STATES PATENTS

| 2,937,219 | 5/1960 | Minnick et al. | 136—154 X |
| 3,235,408 | 2/1966 | Harris | 136—154 X |
| 3,248,265 | 4/1966 | Herbert | 136—154 X |
| 3,043,896 | 7/1962 | Herbert et al. | 136—6 |
| 3,185,590 | 5/1965 | Mayer et al. | 136—6 |

ALLEN B. CURTIS, Primary Examiner.

U.S. Cl. X.R.

136—100, 154

Notice of Adverse Decision in Interference

In Interference No. 96,883, involving Patent No. 3,423,242, W. F. Meyers and J. W. Simmons, ELECTRIC CURRENT-PRODUCING CELL WITH ANHYDROUS ORGANIC LIQUID ELECTROLYTE, final judgment adverse to the patentees was rendered July 9, 1971, as to claim 17.

[*Official Gazette May 6, 1975.*]